No. 683,345. Patented Sept. 24, 1901.
F. W. SKINNER.
CUSHION TIRE.
(Application filed June 11, 1901.)

(No Model.)

WITNESSES. INVENTOR.
Charles T. Hannigan Fredrick W. Skinner.
Robert S. Stanton. By Horatio E. Bellows
Atty.

THE NORRIS PETERS CO., PHOTO-LITHO., WASHINGTON, D. C.

UNITED STATES PATENT OFFICE.

FREDERICK W. SKINNER, OF VALLEY FALLS, RHODE ISLAND, ASSIGNOR TO THE ADVANCE TIRE COMPANY, OF SOUTH DAKOTA.

CUSHION-TIRE.

SPECIFICATION forming part of Letters Patent No. 683,345, dated September 24, 1901.

Application filed June 11, 1901. Serial No. 64,073. (No model.)

*To all whom it may concern:*

Be it known that I, FREDERICK W. SKINNER, a citizen of the United States, residing at Valley Falls, in the county of Providence and State of Rhode Island, have invented a certain new and useful Improvement in Cushion-Tires, of which the following is a specification, reference being had therein to the accompanying drawings.

My invention relates to cushion-tires, and has for its objects simplicity, durability, resiliency, and immunity from collapse by accidental puncture.

To the ends above specified the invention employs certain features which unite the advantages of both a solid and a pneumatic tire; and it consists in the novel construction and combination of parts herein described with reference to the accompanying drawings, wherein—

Figure 1:
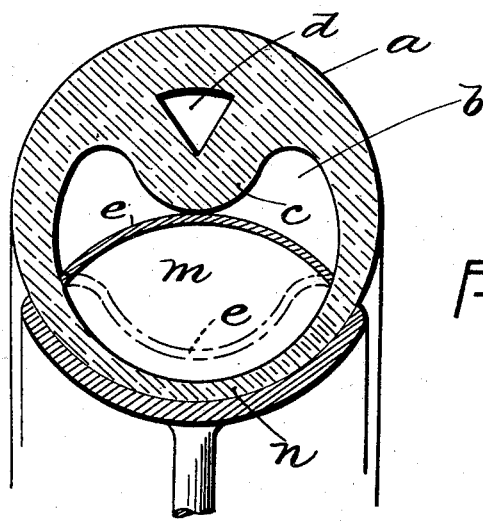
Figure 2:
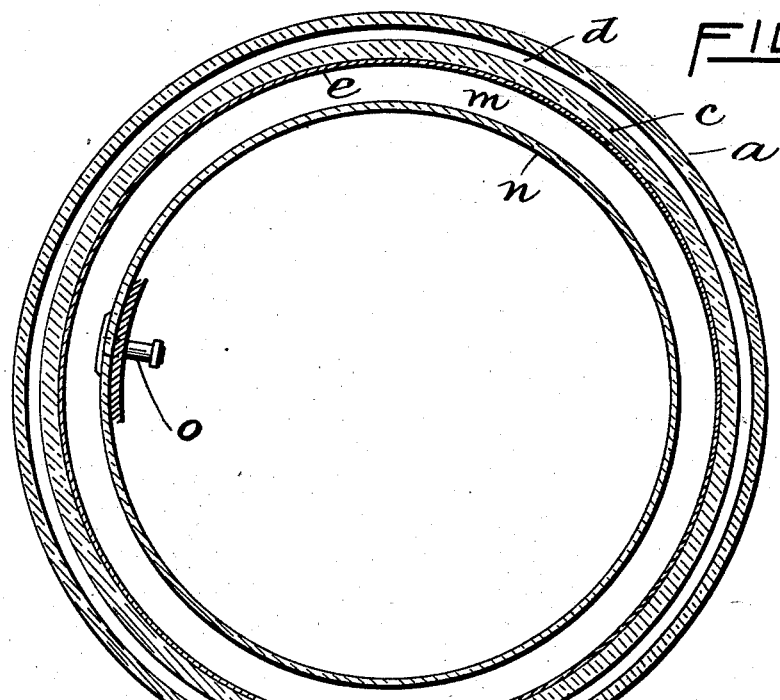

Figure 1 is a transverse section of my improved tire, and Fig. 2 a diametrical section of the same.

Like letters of reference indicate like parts throughout the views.

The structure of my tire is as follows: A solid rubber body $a$ is longitudinally pierced by a nearly-circular opening or chamber $b$, which is broken by a rounded central rib $c$. A second longitudinal opening $d$, preferably a segment in cross-section, pierces the body intermediate the projection $c$ and the periphery of the tire. Across the chamber $b$, also longitudinally disposed, is a flexible diaphragm $e$, preferably of rubber, which in relaxed position rests as shown by broken lines in Fig. 1. This diaphragm is adapted for inflation through the valve $o$ in the usual manner employed for pneumatic tires, and when so treated assumes the position shown by full lines in Fig. 1, producing the chamber $m$ intermediate the diaphragm and the thinner portion of the tire-body $n$.

Having thus described my invention, what I claim as new, and desire to secure by Letters Patent, is—

The herein-described cushion-tire composed of the solid rubber body $a$ with opening $d$ and chamber $b$ and rounded central inwardly-extending rib $c$ opposite said opening, and thin portion $n$ and the flexible diaphragm $e$ within said chamber $b$ and adapted to bear with its convex side against said rounded rib when the tire is inflated all substantially as shown and described.

In testimony whereof I have affixed my signature in presence of two witnesses.

FREDERICK W. SKINNER.

Witnesses:
NELLIE S. REED,
HORATIO E. BELLOWS.